United States Patent [19]
Alter

[11] 4,189,842
[45] Feb. 26, 1980

[54] COMPACT WIDE-RANGE DIGITAL STRETCH GAUGE

[75] Inventor: David L. Alter, Hoffman Estates, Ill.

[73] Assignee: Semi-Mask, Inc., Elk Grove Village, Ill.

[21] Appl. No.: 946,961

[22] Filed: Sep. 29, 1978

[51] Int. Cl.² ............................................. G01L 7/00
[52] U.S. Cl. ............................... 33/149 J; 33/174 L; 73/760
[58] Field of Search ............. 33/149 J, 149 R, 143 R, 33/143 L, 147 N, 147 D, 174 R, 174 L, DIG. 13, 174 A, 178 E, 174 P, 169 B; 73/760, 763, 767, 300, 159

[56] References Cited

U.S. PATENT DOCUMENTS

| | | | |
|---|---|---|---|
| 2,365,353 | 12/1944 | Morris | 33/178 R |
| 3,729,985 | 5/1973 | Sikorra | 33/147 D |
| 3,826,487 | 7/1974 | Förster et al. | 33/DIG. 13 |

*Primary Examiner*—Willis Little
*Attorney, Agent, or Firm*—Darbo & Vandenburgh

[57] ABSTRACT

Above the base are a pair of arms pivotally mounted about a common axis and extending in opposite directions from the axis. At the distal ends of the arms are a pair of downwardly extending pins which form sensors and position the arms at various angular positions depending upon the tension of the tensioned sheet upon which the base rests. A pair of plates extend upwardly from the arms, intercepting a light beam. The amount of the beam intercepted will vary depending upon the angular position of the arms. A photo detector is positioned to receive the unintercepted part of the beam and to produce an electrical signal varying with the amount of light received. A digital voltmeter provides a visual indication of the magnitude of the electrical signal.

8 Claims, 5 Drawing Figures

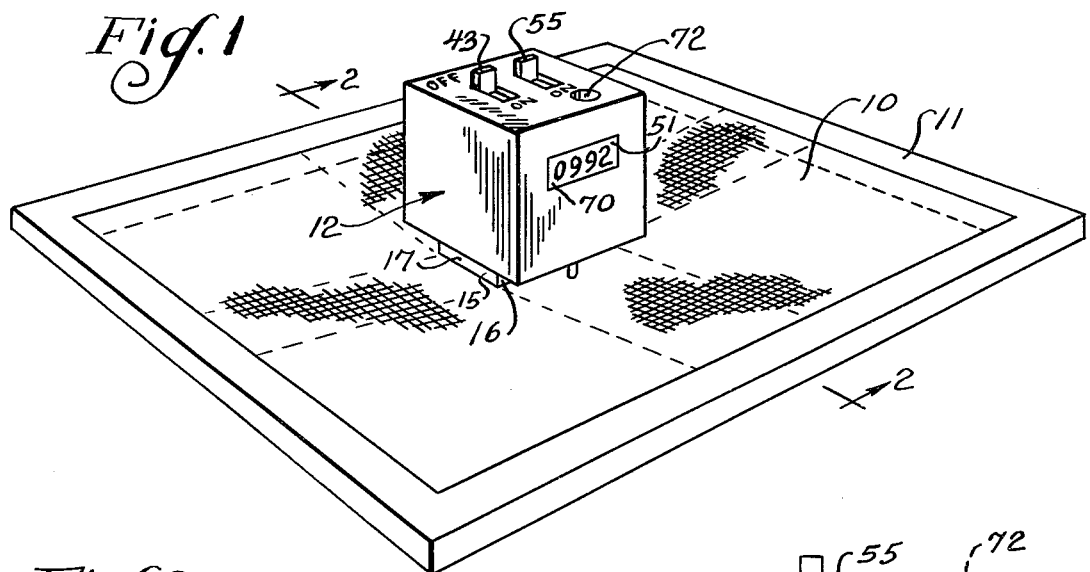
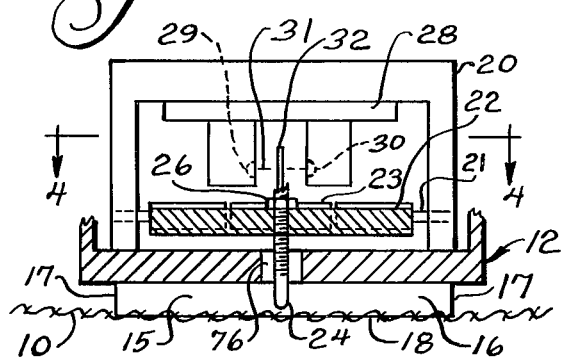
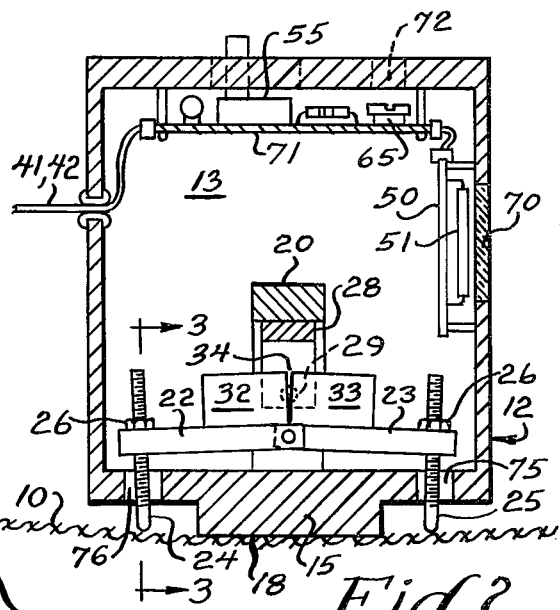
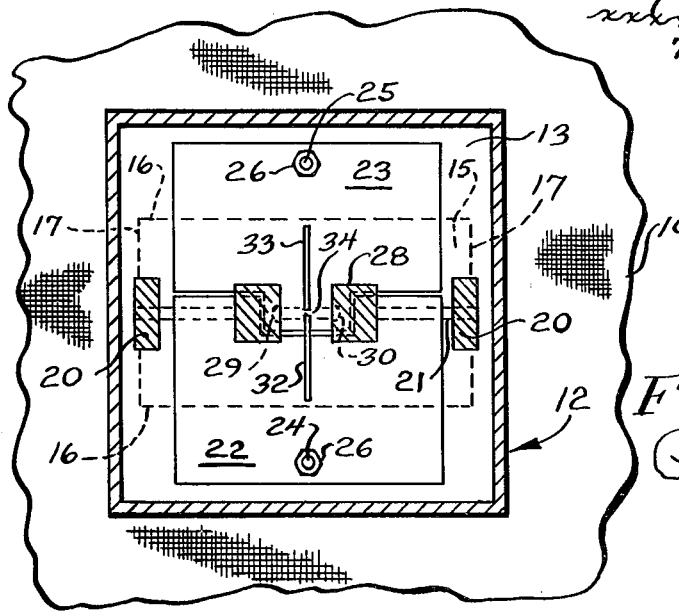

COMPACT WIDE-RANGE DIGITAL STRETCH GAUGE

BACKGROUND AND SUMMARY OF THE INVENTION

The present invention relates to a relatively simple instrument for determining the degree of tension of a tensioned sheet of limp material. While the apparatus is primarily intended for determining the amount of tension in a screen employed in "silk screening" operation, it could be employed in any application where it was desired to determine, or measure, tension of a tensioned sheet of limp material to a given standard, e.g., the tension of a drum head.

While a silk fabric was originally employed in the so-called "silk screening" process for applying designs of colored pigment to a surface of fabric, paper, etc., sheets of various other materials are now employed alternatively for such screens, for example, phosphor bronze or stainless steel metal fabric or fabrics made of synthetic materials such as nylon and/or polyester. In the silk screen operations the fabric, of whatever kind, is placed in a frame and tensioned. See, for example, U.S. Pat. Nos. 2,565,218 and 3,391,635. For many operations it is highly desirable to have a specific degree of tension in the fabric, not necessarily in absolute figures but in comparative figures as related to a predetermined standard. One commercially available device for this purpose comprises a support which spans the frame holding the fabric and rests thereon. A one pound ball is mounted so as to rest on the fabric adjacent its center and a dial gauge mounted on the support and connected to the ball exhibits the extent to which the ball depresses the fabric as a result of the weight thereof.

One problem with such prior art devices is that they do not distinguish between the tension in the warp direction and the tension in the weft direction. If the tension in one of these directions is very high, the tension in the other direction may be relatively low without that fact being indicated by such a prior art device. An important feature of the present invention is that it provides a degree of directional sensitivity whereby information can be obtained as to the tension in the warp direction and the tension in the weft direction.

A significant feature of the present invention is that it is a relatively small, compact unit. It occupies little space when not in use. It may be employed to detect the tension in a sheet of virtually every size that might be employed in a silk screening operation. The components thereof are easily and simply manufactured by conventional production techniques or are commercially available, off-the-shelf, type items.

The metal fabric, as discussed above, deflect less when under a given tension and a given deflecting force is applied than do the natural or synthetic fabrics. Thus the present invention incorporates a range or sensitivity switch to accommodate the apparatus to such characteristics.

Other advantages and objects of the present invention will be apparent from the following description.

DESCRIPTION OF THE DRAWINGS

FIG. 1 is an isometric view of an embodiment of the invention positioned on a screen whose tension is to be measured;

FIG. 2 is a section as seen at line 2—2 of FIG. 1;

FIG. 3 is a section as seen at line 3—3 of FIG. 2;

FIG. 4 is a section as seen at line 4—4 of FIG. 3; and

DESCRIPTION OF SPECIFIC EMBODIMENT

Figure 5:
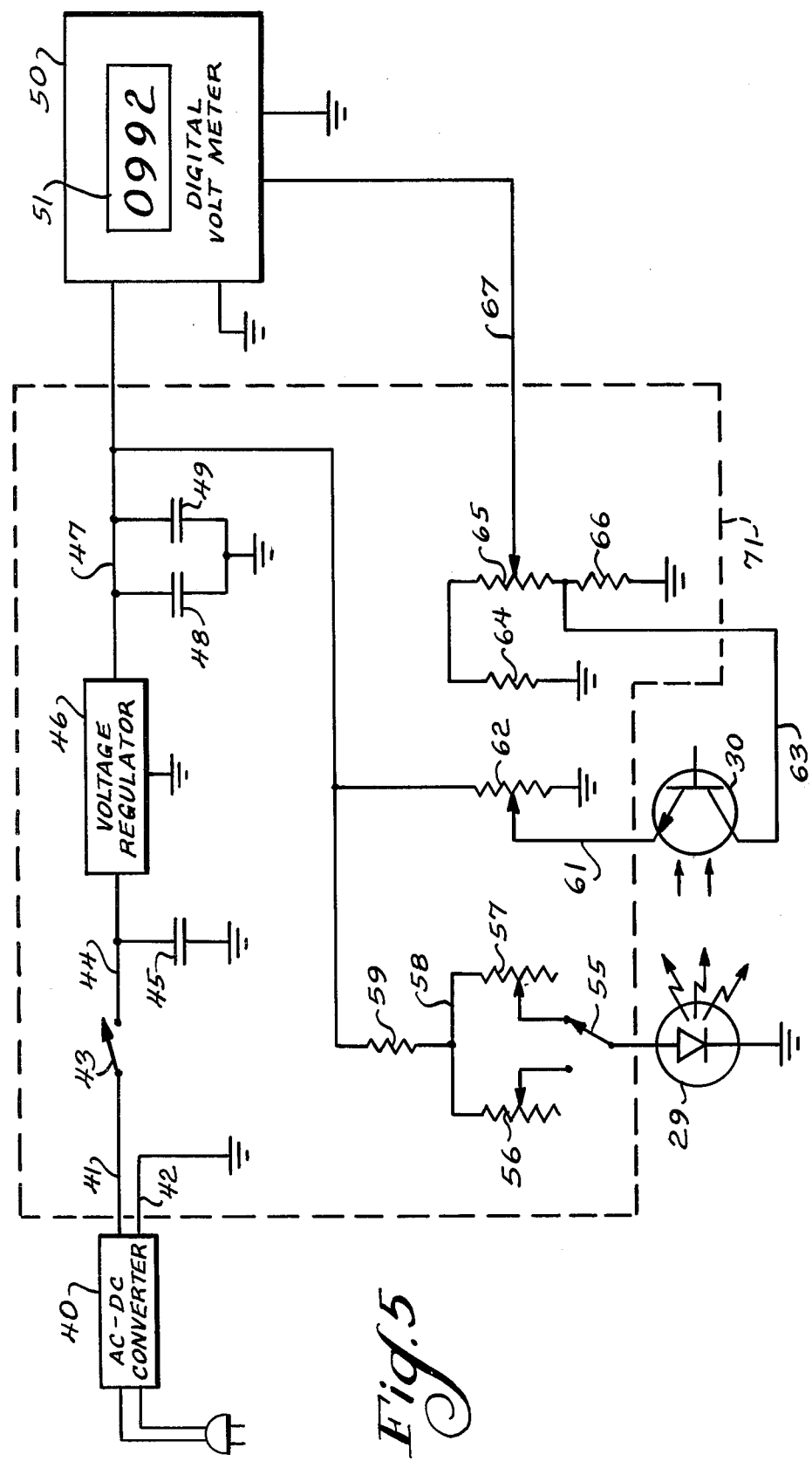
FIG. 5 is a schematic of the electrical circuit employed in the described embodiment.

The following disclosure is offered for public dissemination in return for the grant of a patent. Although it is detailed to ensure adequacy and aid understanding, this is not intended to prejudice that purpose of a patent which is to cover each new inventive concept therein no matter how others may later disguise it by variations in form or additions or further improvements.

The present invention is for determining the degree of tension in a fabric 10 (as previously described), held by a frame 11. The frame, or apparatus used therewith, has means for tensioning the fabric. For purposes of illustration see U.S. Pat. Nos. 2,565,218 and 3,391,635 for such devices. The embodiment of the present invention comprises a body, generally 12, forming the frame of the instrument. It defines a relatively light tight internal compartment 13. At the lower side of the body is a rectangular base 15 having two sides 16, two ends 17 and a bottom 18. As is best seen in FIG. 4, the sides 16 of the base are substantially longer than are the ends 17. The body has a construction, not shown, to enable it to be disassembled for access to the interior thereof.

The body or frame 12 includes an inverted U-shaped mount 20. An axle or pin 21 is held in this mount and defines a pivotal axis in a plane midway between the sides 16. A pair of arms 22 and 23 are pivotally mounted on this axle. Pins 24 and 25 form feelers and are threaded into the arms at the distal ends thereof. Nuts 26 are jammed against the arms to lock the pins in place. These pins extend downwardly through openings 75, 76 in the body.

A light barrier detection device is secured to mount 20. This device includes a support 28, a light emitting diode 29 and a light sensor 30. The light emitting diode (or light source) forms a beam of light directed at the sensor as represented by line 31. Positioned in the path of this light beam is an adjustable shutter formed by plates 32 and 33. Plate 32 is secured to the top of arm 22 and plate 33 is secured to the top of arm 23. Thus as the arms pivot the size of space 34 between the adjacent edges 32a and 33a of the plates will be varied. Thus the shutter adjusts the size of the light beam that will be intercepted in relation to the angular positions of the arms.

Referring to FIG. 5, an A.C.-D.C. converter 40 is plugged into a 110 volt A.C. outlet and supplies nine volts of direct current at wires 41, 42. Alternatively, a nine volt battery may be incorporated as the power supply. Wire 41 connects to an on-off switch 43. A wire 44 connects switch 43 to a smoothing capacitor 45 and a voltage regulator 46. Voltage regulator 46 is one of the commercially available such devices and produces five volts between wire 47 and ground. A pair of capacitors 48, 49 connect to wire 47. Wire 47 also supplies power to a commercially available digital voltmeter 50. Voltmeter 50 has a panel 51 on which the voltage readings are exhibited.

The light emitting diode 29 is connected to a range switch 55 which in turn is connected to a pair of variable resistors 56 and 57. These resistors are connected together by a wire 58. A resistor 59 is connected between wires 47 and 58.

A wire 61 connects phototransistor 30 (serving as a light sensor) to potentiometer 62 which also is connected across the five volt power supply. A wire 63 connects the phototransistor 30 to a voltage divider consisting of resistor 64, potentiometer 65 and resistor 66. The slider of potentiometer 65 is connected to the input of the digital voltmeter by a wire 67.

Referring back particularly to FIG. 2, the digital voltmeter 50 is mounted so that its display panel is behind a window 70 in the wall of the body. Window 70 is made of a material which is particularly effective in preventing the transmission of infrared light, while permitting the transmittal of light in the visible part of the spectrum. Other than the light source and the light sensor, the remaining electrical elements are mounted on a circuit board 71. Potentiometer 65 serves as a zeroing adjustment and is mounted at the inner end of an opening 72.

Capacitors 45, 48 and 49 are 220 microfarads, 10 microfarads and 0.1 microfarads respectively. Resistors 59, 64 and 66 are 68 ohms, 100 K. ohms and 10 k. ohms respectively. Variable resistors 56 and 57 are each 500 ohms. Potentiometers 62 and 65 are 1 k. ohms and 25 K. ohms respectively. Voltage regulator 46 is a U7805 manufactured by Texas Instruments. Digital voltmeter 50 is a model 325 manufactured by International Microtronics Corp. Light source 29 is a T1L228 and light sensor 30 is a 2N5777.

In a prototype unit the body 12 was three inches (7.62 cm.) by three inches by three and five-eighths inches (9.21 cm.) high plus a base 15 of one-quarter inch (0.63 cm.) in height. The ends 17 of the base were one and one-half inches (3.88 cm.) long; while sides 16 were two and three-quarters inches (6.99 cm.) long. The unit had a weight of one pound, fourteen ounces (0.850 kg.).

OPERATION

With the frame 11 positioned relatively horizontal the instrument (tension detection apparatus) is positioned approximately in the center with the two feelers 24, 25 in a line parallel to either the weft or warp threads. The apparatus is of such a weight that it will cause a sag in the screen. Thus, as seen in FIG. 2, the fabric will extend upwardly from the side edges 16 of the bottom 18 of the base 17. Therefore the bottom of the feelers 24 and 25 will be higher than the bottom 18. This will result in the two arms 22 and 23 being pivoted upwardly to decrease the size of the opening 34 in the shutter (defined by plates 32, 33). As the fabric is tensioned in the direction parallel to the line between the feelers 24, 25, there will be less sag in the fabric. Thus the bottom of the feelers 24, 25 will be closer to the elevation of the plane defined by the bottom 18 of the base. The result will be that the arms will be pivoted downwardly from the previous position, thus increasing the size of opening 34. Since it will then be possible for more of the light beam 31 to pass through the shutter opening a correspondingly different reading will be displayed on panel 51.

Before using the instrument it may be zeroed by placing it on a perfectly planar surface. At that time, of course, the bottom of feelers 24, 25 will be at the same elevation as the bottom 18 of the instrument base. The potentiometer 65 is then adjusted to give a "zero" reading (whatever that may be). When the instrument is then placed upon the fabric in the manner previously described, the panel 51 will display a reading different from that "zero" reading, the magnitude of the difference being related to the magnitude of the fabric tension. The range adjustment resistors 56, 57 are preset and normally do not require adjustment during use. They are set at points to give different ranges for use with different types of fabric material.

The interior 13 of the instrument is relatively light tight so that the magnitude of the light received by sensor 30 is not affected by ambient light outside the instrument. The openings 72, etc., provided for the control components are effectively blocked by those components and by the panel board 71. The openings 75, 76 through which the feelers 25, 24 extend are on the underside of the instrument and also have the arms 22, 23 thereover. Thus there is little opportunity for light to enter through these openings to affect the operation of the light sensor. The light emitting diode 29 and the phototransistor 30 operate primarily in the infrared part of the spectrum and are relatively insensitive so far as the visible part of the spectrum is concerned.

It should be noted that the fabric 10 will be relatively flat under the base 15 and, except at the corners between the sides 16 and the ends 17, will have a slope primarily in a single direction, i.e., in a direction normal to the respective side or end. This is particularly true of a line between the feelers 24, 25 since the sides 16 are relatively long with the feelers centered therealong. The shape of the fabric from the bottom 18 to the frame 11 may be likened to an inverted, truncated pyramid. The feelers also are relatively close to the sides 16. In an actual embodiment they are approximately thirteen thirty seconds of an inch (10.32 mm) when resting on a flat surface. This distance should not be greater than one inch (2.54 cm) nor less than about one eighth of an inch (3.175 mm). The result is that the instrument is remarkably sensitive to the fabric tension in the direction parallel to the line between the feelers. The tension reading may be taken with the instrument positioned on the fabric in one direction, and then the instrument rotated ninety degrees to take a tension reading in the other direction.

For normal use in the silk screen industry, it is not necessary to know absolute tension values, but only the tension of a particular screen as related to the tension of another or as to a standard. Thus with the instrument "zeroed" as described above, the tension on the screen is adjusted until the readings on the panel 51 correspond to that of a previously established standard. The instrument can be calibrated to produce absolute readings, but this is unnecessary in the application described.

While it is desirable that the instrument be centered on the screen 10 when a reading is to be made so that the upward slope of the screen from each of sides 16 is the same, the instrument will tolerate some miscentering. For example, referring to FIG. 2, assume that the screen at the right side has a greater slope than that at the left side. Thus the arm 23 will be pivoted relatively high and the arm 22 will have a relatively lower setting. Both will correspondingly affect the extent to which the shutter blocks off the light beam and the reading on screen 51 will substantially represent an averaging of the arm positions, or fabric slope.

I claim:

1. An instrument for detecting the degree of tension of a generally horizontal, tensioned sheet of limp material, said apparatus comprising:
    a body including a base having a bottom with two spaced sides and of a size to be positioned on said sheet and having sufficient weight to cause said sheet to be depressed from a planar condition, whereby the sheet slopes upwardly from said sides;

a pair of arms above said bottom and pivotally connected to said body for movement about an axis located in a plane midway between said sides, said arms having distal ends at opposite sides of said plane respectively;

a pair of feelers positioned outboard of said sides respectively, each feeler being affixed to a respective arm adjacent the distal end of the respective arm and being immovable with respect to the respective arm during the normal operation of the instrument, each feeler extending downward from the respective arm and having a distal end supported on the tensioned material outboard of the respective side, whereby an increase in the tension of the material will cause the feelers to descend closer to the elevation of said bottom and the respective arms to pivot accordingly and a decrease in the tension of the material will cause the opposite movements of the feelers and arms; and means operatively associated with said arms for detecting and providing a visual indication of the pivotal positions of the arms with respect to each other.

2. An instrument as set forth in claim 1, wherein said bottom has two ends, said sides being longer than said ends, said feelers being positioned on a line extending midway between said ends and normal to said sides.

3. An instrument as set forth in claim 1, wherein said means includes a light source, a light sensor to receive light from the source and establish an electrical signal which varies in relation to the amount of light received, and detecting means connected to the sensor to produce said visual indication as dictated by said electrical signal, part of said means being mounted on the arms for varying the amount of light received by the sensor in relation to said pivotal positions of the arms with respect to each other.

4. An instrument as set forth in claim 3, wherein said part of said means comprises plates secured to said arms respectively, said plates having edges approximately in said plane, in juxtaposition to each other and in said path whereby as the arms move in one direction said edges separate to allow more light to pass between them and as the arms move in the other direction said plates intercept more of the beam.

5. An instrument as set forth in claim 3, wherein said detecting means includes a digital voltmeter connected to said sensor for producing said visible indication of the light received by the sensor.

6. An instrument as set forth in claim 3, wherein said source and sensor operate principally in the infrared part of the spectrum.

7. An instrument for detecting the degree of tension of a generally horizontal, tensioned sheet of limp material, said apparatus comprising:

a body including a base having a bottom with two spaced sides and two spaced ends and of a size to be positioned on said sheet and having sufficient weight to cause said sheet to be depressed from a planar condition, whereby the sheet slopes upwardly from said sides and at a location midway between said ends the slope of the part of the sheet adjacent the sides is in the direction substantially normal to the sides;

a pair of feelers each having a bottom end outboard of a respective side of the bottom and about midway between said ends, said feeler ends being a common distance from their respective sides;

means connecting the feelers to the base for permitting the bottom ends of the feelers to move in generally vertical directions above said bottom; and means connected to the last mentioned means for providing a visual indication of the average of the extent of the generally vertical movement of the ends.

8. An instrument as set forth in claim 7, wherein said distance is between about one-eighth of an inch and one inch.

* * * * *